United States Patent
Das et al.

(10) Patent No.: US 9,264,498 B2
(45) Date of Patent: Feb. 16, 2016

(54) METHODS AND APPARATUS FOR CREATION, ADVERTISEMENT, AND DISCOVERY OF PEER-TO-PEER OVERLAY NETWORKS

(75) Inventors: Saumitra Mohan Das, San Jose, CA (US); Vidya Narayanan, San Diego, CA (US); Lakshminath Reddy Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 882 days.

(21) Appl. No.: 12/720,597

(22) Filed: Mar. 9, 2010

(65) Prior Publication Data

US 2010/0312622 A1    Dec. 9, 2010

Related U.S. Application Data

(60) Provisional application No. 61/159,387, filed on Mar. 11, 2009, provisional application No. 61/185,110, filed on Jun. 8, 2009.

(51) Int. Cl.
*G06F 15/16* (2006.01)
*H04L 29/08* (2006.01)
(Continued)

(52) U.S. Cl.
CPC ............ *H04L 67/16* (2013.01); *G06Q 30/0241* (2013.01); *H04L 29/06* (2013.01); *H04L 29/12113* (2013.01); *H04L 61/1541* (2013.01); *H04L 67/104* (2013.01); *H04L 67/1046* (2013.01)

(58) Field of Classification Search
USPC .................. 709/200–236, 250; 370/231–245, 370/351–409
See application file for complete search history.

(56) References Cited

U.S. PATENT DOCUMENTS

| | | | |
|---|---|---|---|
| 7,401,132 B1 * | 7/2008 | Krumel et al. | 709/220 |
| 2003/0002521 A1 * | 1/2003 | Traversat et al. | 370/465 |

(Continued)

FOREIGN PATENT DOCUMENTS

| | | | | |
|---|---|---|---|---|
| CN | 1848817 A | | 10/2006 | |
| EP | 08290626 | * | 6/2008 | ............. H04L 12/56 |
| TW | I276328 B | | 3/2007 | |

OTHER PUBLICATIONS

Lua et al., 'A survey and comparison of peer-to-peer overlay network schemes', IEEE communication, 2nd Quarter, 2005.*
International Search Report and Written Opinion—PCT/US2010/027053, International Search Authority—European Patent Office—Jun. 10, 2010.

(Continued)

*Primary Examiner* — Zarni Maung
(74) *Attorney, Agent, or Firm* — Paul Kuo

(57) ABSTRACT

Methods and apparatus for creation, advertisement, and discovery of peer-to-peer overlay networks. A method includes detecting one or more communication links that allow a node to communicate with other nodes, determining that a universal overlay network is accessible using at least one communication link, selecting a selected communication link from the at least one communication link, and joining the universal overlay network using the selected communication link. An apparatus includes a transceiver configured to detect one or more communication links that allow a node to communicate with other nodes, and a processor configured to determine that a universal overlay network is accessible using at least one communication link, select a selected communication link from the at least one communication link, and join the universal overlay network using the selected communication link.

36 Claims, 8 Drawing Sheets

(51) Int. Cl.
*H04L 29/06* (2006.01)
*G06Q 30/02* (2012.01)
*H04L 29/12* (2006.01)
*G06F 12/00* (2006.01)

(56) References Cited

U.S. PATENT DOCUMENTS

2003/0187973 A1* 10/2003 Wesley .......................... 709/224
2004/0246911 A1* 12/2004 Bonsma et al. ............... 370/254
2010/0064049 A1* 3/2010 Magharei et al. ............. 709/229

OTHER PUBLICATIONS

Paul Francis: "Yoid: Extending the Internet Multicast Architecture" ACIRI Apr. 2, 2000, pp. 1-39, XP002583585 Retrieved from the Internet: URL:http://wvvw.i cir.org/yoi d/docs/ycHtmlL/htmlRoot. html> [retrieved on May 25, 2010] paragraph [01.4] p. 2.1.
Ratnasamy S., et al., "A Scalable Content-Addressable Network" Computer Communication Review, ACM, New A29York, NY, US LNKD-DOI:10.1145/964723.383072, vol. 31, No. 4, Oct. 1, 2001, pp. 161-172, XP001115754 ISSN: 0146-4833 paragraph [0001]—paragraph [02.2].
Taiwan Search Report—TW099107161—TIPO—Apr. 1, 2013.

* cited by examiner

METHODS AND APPARATUS FOR CREATION, ADVERTISEMENT, AND DISCOVERY OF PEER-TO-PEER OVERLAY NETWORKS

CLAIM OF PRIORITY UNDER 35 U.S.C. §119

The present Application for Patent claims priority to Provisional Application No. 61/159,387 entitled "Methods and Apparatus for Creation, Advertisement and Discovery of Peer To Peer Overlay Networks" filed Mar. 11, 2009, and assigned to the assignee hereof and hereby expressly incorporated by reference herein.

The present Application for Patent also claims priority to Provisional Application No. 61/185,110 entitled "Methods and Apparatus for Creation, Advertisement, and Discovery of Peer To Peer Overlay Networks" filed Jun. 8, 2009, and assigned to the assignee hereof and hereby expressly incorporated by reference herein.

BACKGROUND

1. Field

The present application relates generally to the operation of overlay networks, and more particularly, to methods and apparatus for creation, advertisement, and discovery of peer-to-peer overlay networks.

2. Background

A network in which member nodes obtain services in the absence of server-based infrastructure is referred to as a "peer-to-peer" overlay network. In a peer-to-peer overlay, peer nodes co-operate with each other both to provide services and to maintain the network. Peer-to-peer overlay networks can be built on top of one or more underlying networks, such as networks utilizing the Internet Protocol (IP).

An overlay network is typically formed after an overlay advertisement is made on a medium that is common to multiple nodes, such as the Internet. However, access to the Internet to bring together overlay advertisers and nodes interested in joining the overlay network may not always exist. This situation may be problematic because even though Internet access may not be available there may still be a need to advertise and form overlay networks. For example, two nodes may individually use link local broadcast to attempt to create an overlay network. However this can result in a first set of nodes joining a first overlay network advertised by one of the nodes and a second set of nodes joining a second overlay network advertised by the other node. This results in concurrent overlay creation that can cause islands of connectivity. This situation can also occur if the interfaces used by the nodes to advertise the overlay networks are different.

Even if the Internet is available, it may be difficult for nodes to join an advertised overlay network. For example, nodes that have decided to join an overlay network need to learn how to reach bootstrap peers that control the joining process. Typically, bootstrap peers are required to have globally routable addresses and it may be difficult for a node to reach these bootstrap peers.

Thus, there are two challenges associated with overlay network creation, advertisement, and discovery. The first challenge is how to reduce the chance of concurrent overlay creation that can cause islands of connectivity. The second challenge is to make joining an overlay network more general and useful, and to do that, bootstrap peer reachability needs to be simplified.

One approach for solving overlay network discovery problems uses a domain name service (DNS) infrastructure to advertise overlay networks. For example, each node uses a dynamic DNS-like infrastructure to advertise overlay networks. Unfortunately, this technique is inefficient and makes it difficult for a node to discover and join a particular overlay network. For example, this approach does not address the problem of concurrent overlay network creation since it assumes Internet access is always available to advertise or discover overlays. Furthermore, discovery is an even harder problem since implementing a search over the DNS infrastructure does not scale.

Therefore, it would be desirable to have a simple cost effective mechanism that operates to facilitate the creation, advertisement, and discovery of peer-to-peer overlay networks.

SUMMARY

In one or more aspects, a universal discovery system, comprising methods and apparatus, is provided that operates to facilitate the creation, advertisement, and discovery of peer-to-peer overlay networks. In various implementations of the universal discovery system, all nodes attempt to become part of identifiable overlay networks based on the communication mediums that are accessible. Furthermore, each node attempts to become part of a universal overlay at all times. Once part of the universal overlay network, published overlay network advertisements facilitate easy connectivity to bootstrap peers using universal node locators (UNLs).

In an aspect, a method is provided for operating a node to discover a peer-to-peer overlay network. The method comprises detecting one or more communication links that allow the node to communicate with other nodes, determining that a universal overlay network is accessible using at least one communication link, selecting a selected communication link from the at least one communication link, and joining the universal overlay network using the selected communication link.

In an aspect, an apparatus is provided for discovering peer-to-peer overlay networks. The apparatus comprises a transceiver configured to detect one or more communication links that allow the node to communicate with other nodes, and a processor configured to determine that a universal overlay network is accessible using at least one communication link, select a selected communication link from the at least one communication link, and join the universal overlay network using the selected communication link.

In an aspect, an apparatus is provided for discovering peer-to-peer overlay networks. The apparatus comprises means for detecting one or more communication links that allow the node to communicate with other nodes, means for determining that a universal overlay network is accessible using at least one communication link, means for selecting a selected communication link from the at least one communication link, and means for joining the universal overlay network using the selected communication link.

In an aspect, a computer program product is provided for discovering peer-to-peer overlay networks. The computer program product comprises a computer-readable medium embodying codes executable by a processor to detect one or more communication links that allow the node to communicate with other nodes, determine that a universal overlay network is accessible using at least one communication link, select a selected communication link from the at least one communication link, and join the universal overlay network using the selected communication link.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a universal discovery system that operates to facilitate creation, advertisement, and discovery of peer-to-peer overlay networks.

Figure 1:
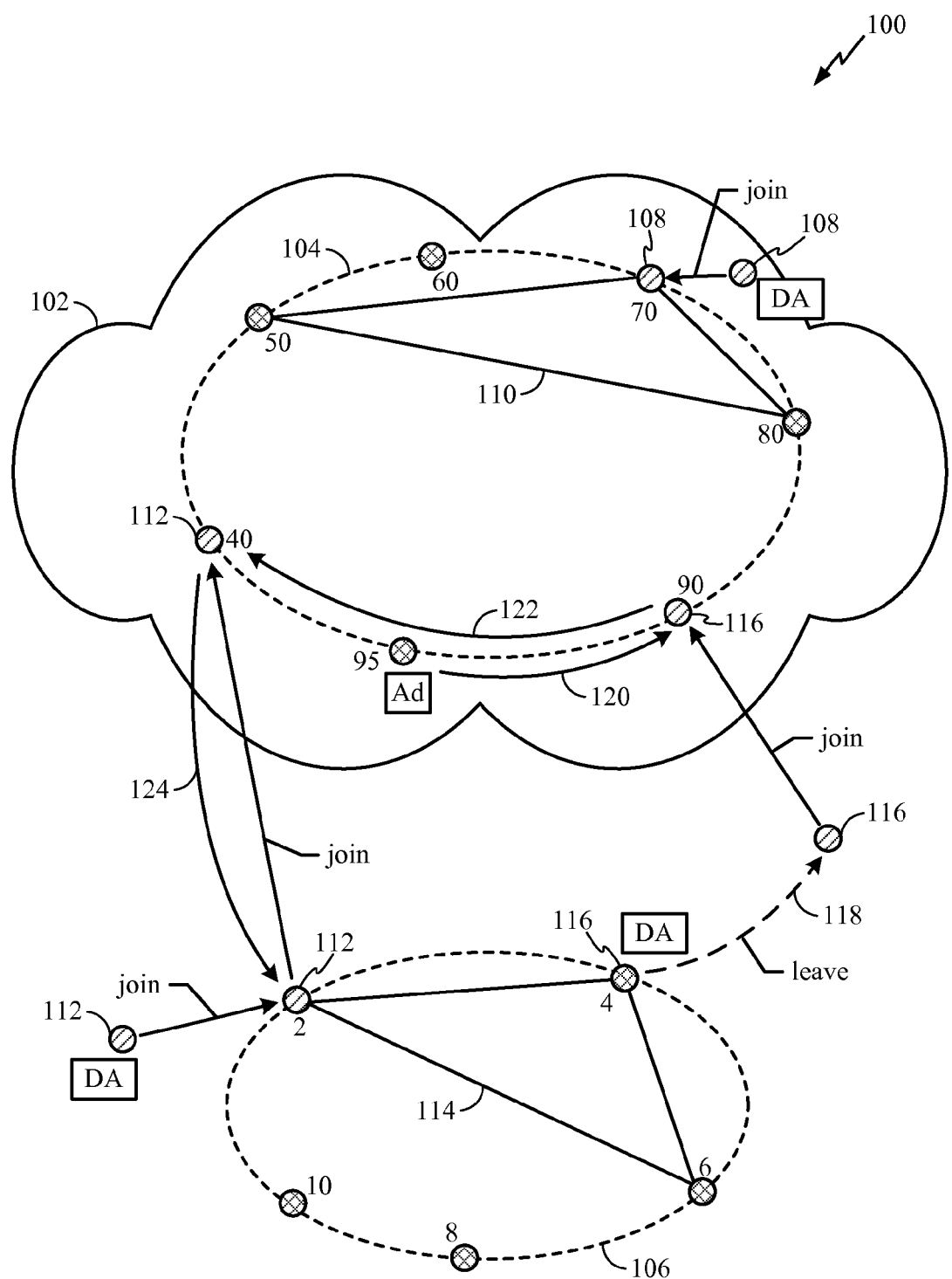
FIG. 1 shows a network that comprises an exemplary universal discovery system.

FIG. 1 shows a network 100 that comprises an exemplary universal discovery system. The network 100 comprises an underlying network 102 which in one implementation comprises an Internet Protocol network. Although the underlying network 102 is shown as a single entity, the underlying network may comprises any number and/or types of networks such as WANs, LANs, wireless networks or any other type of network.

In accordance with aspects of the universal discovery system, a discovery apparatus (DA) is provided for use at all or any of the nodes shown in FIG. 1. For example, the DA is shown at selected nodes of the network 100 and operates to provide the functions of the universal discovery system described herein.

Connected Universal Overlay Network

The underlying network 102 comprises a "connected universal overlay network" 104. The connected universal overlay network 104 is defined as a single universal overlay network created by Internet connected devices. The connected universal overlay network 104 comprises a subset of nodes of the underlying network 102 that are assigned corresponding overlay node identifiers. For example, the connected universal overlay network initially comprises nodes 50, 60, 80, and 95. The nodes communicate with each other utilizing the services of the underlying network 102. For example, the nodes of the connected universal overlay network 104 are connected by communication links provided by the underlying network 102 to form desired routing paths. It should also be noted that the connected universal overlay network 104 may have any topology or architecture to enable any routing configuration and is not limited to the configuration shown in FIG. 1.

Disconnected Universal Overlay Network

The network 100 also comprises a "disconnected universal overlay network" 106. The disconnected universal overlay network 106 is defined as a single universal overlay network created by non-Internet connected devices. For example, the disconnected universal overlay network initially comprises nodes 4, 6, 8, and 10. The nodes of the disconnected universal overlay network 106 communicate with each other without utilizing the services of an underlying network. For example, the nodes utilize any suitable transmission technology (such as WiFi technology) to communication with each other. The nodes form the disconnected overlay network 106 when one node initially advertises the disconnected overlay network 106 and each of the other nodes progressively joins. It should be noted that the disconnected universal overlay network 106 is not limited to utilizing WiFi technology and may utilize any other type of communication technology. Furthermore, the universal discovery system is suitable for use with any number and/or types of disconnected overlay networks. It should also be noted that the disconnected universal overlay network 106 may have any topology or architecture to enable any routing configuration and is not limited to the configuration shown in FIG. 1.

Discovery Apparatus

The DA operates at a node to provide the following functions in accordance with the universal discovery system described herein.

1. Maintain a database of overlay networks associated with communication interfaces available at a particular node.
2. Determine available communication links at power-on or any time during operation.
3. Select overlay networks to join based on available communication links.
4. Join a connected universal overlay network if possible.
5. Join a disconnected universal overlay network if possible.
6. After joining a universal connected or disconnected overlay networks, advertise, and discover any overlay networks such that bootstrap peers are accessed using UNLs.

Exemplary Operation

During operation of the universal discovery system, each node attempts to become part of one or more overlay networks based on communication mediums (or "links") available to the node. For example, a node comprises one or more communication interfaces that allow communication over corresponding communication links. For example, the communication interfaces comprise Ethernet, WiFi, Bluetooth, and/or any other type of interface that can be used to communicate with other nodes. Each node is configured with or otherwise obtains information identifying overlay networks that are associated with one or more of its communication interfaces.

The DA operates to determine whether there is an available communication link associated with each interface. For example, a node may have a WiFi interface but may not be within range of any other WiFi enabled nodes with which to establish a WiFi communication link. Once the DA determines the available communication links, it searches its database to identify overlay networks associated with each link. The DA then attempts to join the identified overlay networks associated with each link. For example, if a node has access to the Internet on a particular communication link, it attempts to join the connected universal overlay network. If a node does not have Internet connectivity, it can still join overlays on other interfaces that have been enabled for overlay operation, such as the WiFi, Bluetooth or other interfaces. The disconnected universal overlay network 106 is an example of nodes that have formed a disconnected overlay network based on an available WiFi communication links. Nodes may choose to join multiple overlays via multiple interfaces as per policy information associated with each node.

Joining the Connected Universal Overlay

Referring again to FIG. 1, node 108 is located on the underlying network 102 and the DA located at node 108 determines that a communication link is available to allow it to join the connected universal overlay network 104. For example, the node may include a wireless wide area network (WWAN) interface that is able to communicate on the underlying network 102. In one implementation of the universal discovery system, if a node has Internet connectivity it always attempts to join the connected universal overlay network. Thus, the DA at node 108 determines that a WWAN communication link is available and uses this link to join the connected universal overlay network 104 and is assigned node identifier 70.

Once connected to the connected universal overlay network 104, the node 108 operates to advertise or join other connected overlays. For example, the node 108 joins the connected overlay 110, which also comprises nodes 50 and 80. For example, the connected overlay 110 may be an overlay wherein participants can obtain sports clips or other sports related content.

Joining the Disconnected Universal Overlay

Referring again to FIG. 1, node 112 is not located on the underlying network 102 and the DA located at node 112 determines that a communication link is available to allow it to join the disconnected universal overlay network 106. For example, the node may include a WiFi interface that is able to communicate with other nodes on the disconnected universal overlay network 106. In one implementation of the universal discovery system, a node always attempts to join the disconnected universal overlay network. Thus, the DA at node 108 determines that a WiFi communication link is available and uses this link to join the disconnected universal overlay network 106 and is assigned node identifier 2.

Once joined to the disconnected universal overlay network 106, the node 112 operates to advertise or join other disconnected overlays. For example, the node 112 joins the disconnected overlay 114, which also comprises nodes 4 and 6. For example, the disconnected overlay 114 may be a photo-sharing overlay wherein participants can participate in photo sharing.

Advertising Disconnected Overlays

To illustrate this aspect of the universal discovery system, it will be assumed that the DA at node 112 determines that a link exists whereby the node 112 can join the connected universal overlay network 104. For example, the node 112 comprises a WWAN interface and a WWAN link is detected to allow the node 112 to communicate with the underlying network 102. In doing so, the node 112 discovers the connected universal overlay network 104, and as a result of joining, is assigned overlay identifier 40, as illustrated in FIG. 1.

Once connected to the connected universal overlay network 104, the node 112 operates to advertise the disconnected universal overlay network 106 on the connected universal overlay network 104. For example, the node 112 publishes an advertisement (Ad) at node 95 that identifies the disconnected overlay network 106 and indicates that a node 40 can be used to reach the disconnected universal overlay network 106. For example, node 40 is identified in the Ad by a universal node locator relative to the connected overlay network 104. Other nodes on the connected universal overlay network 104 can then discover the Ad and reach the disconnected universal overlay network 106 through node 112 (identified as 40).

This advertisement mechanism can result in the formation of other application-specific overlay networks. Furthermore, this mechanism applies to both disconnected and connected universal overlays. It should also be noted that the node 112 may also advertise the disconnected overlay network 114 on the connected universal overlay 104. Thus, any of the nodes located on the connected universal overlay 104 may join and participate with the disconnected overlay network 114 by using the node identified as 40 on the connected universal overlay 104.

Node Mobility

The universal discovery system allows nodes to remain connected to each other during node mobility. For example, node 116, which has node identifier 4 on the disconnected universal overlay network 106, leaves the disconnected universal overlay network 106, as shown at 118. For instance, node 116 is a mobile phone that is changing its geographic location. The node 116 can query the connected universal overlay network 104 either by joining the overlay, or as a client. For this description, it will be assumed that the node 116 comprises an interface that provides a communication link to the underlying network 102, and therefore allows the node 116 to join the connected universal overlay network 104, and is assigned node identifier 90. The node 116 is then able to discover (shown at 120) the Ad at node 95 published by the node 112. The Ad identifies UNL 40 (node 112) on the connected universal overlay network 104 that can be used to bootstrap back into the disconnected overlay network 106, as illustrated by paths 122 and 124. Thus, the node 116, which left the disconnected overlay network 106, is able to communicate with nodes of the disconnected overlay network 106 through the use of the connected universal overlay network 104. As a result, the node 116 may still communicate on the photo-sharing overlay 114.

Universal Node Locators

As described above, the universal discovery system facilitates a common medium over which nodes can perform overlay advertisements or discover overlay networks and then join them. In this context, the system provides a mechanism where bootstrap nodes are named in the context of the universal overlay network. This removes the deployment consideration and difficulty with determining whether a bootstrap node is publicly reachable or not when advertising an overlay.

Thus, the universal discovery system provides that the overlay configuration document contains universal node locators instead of IP addresses and port numbers for specifying bootstrap peers. Consider an example of the photo-sharing overlay 114 advertised on the connected universal overlay network 104 at node identifier 95. In the overlay configuration document of the photo-sharing overlay, a bootstrap peer element may contain an entry of the form;

overlay-node://40/;context="universal overlay disc"

This specifies that the bootstrap peer is reachable via a disconnected universal overlay. Any node can then connect to the node identifier 40 on the connected universal overlay network 104 to then be bootstrapped to the photo-sharing disconnected overlay 114.

Therefore, the system provides a mechanism for advertising and discovery of overlays in any scenario of nodes either being connected to the Internet or even when they are in disconnected mode. It allows an overlay to be discovered and reformed across disjoint subnets (e.g. mobility of a node from a closed home network to the mobile internet) by creating a common medium for reachability of overlays. A more detailed description of the operation of the DA and the universal discovery system is provided below.

Figure 2:
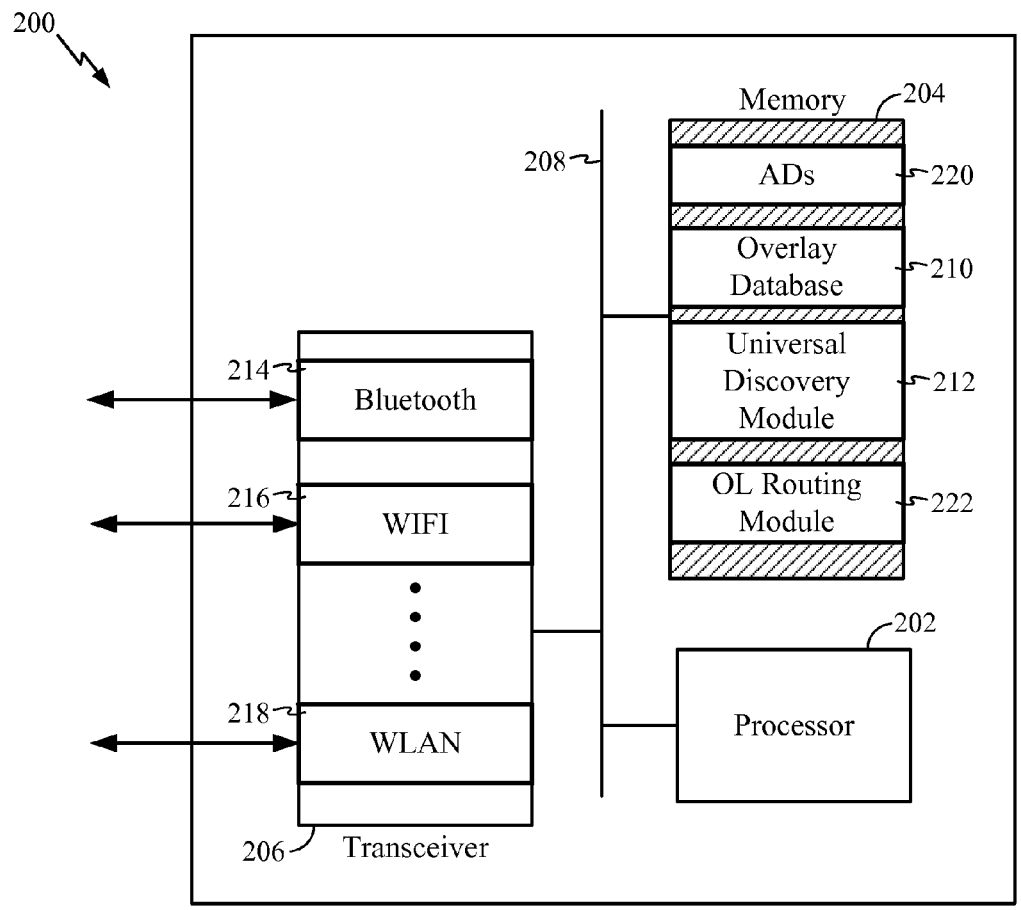
FIG. 2 shows exemplary discovery apparatus for use at a node in accordance with the universal discovery system.

FIG. 2 shows exemplary discovery apparatus 200 for use at a node in accordance with the universal discovery system. For example, the DA 200 is suitable for use as the DA shown in FIG. 1. The DA 200 comprises processor 202, memory 204, and transceiver 206 all coupled to communicate on a data bus 208. It should be noted that the DA 200 is just one implementation and that other implementations are possible.

The transceiver 206 comprises hardware and/or hardware executing software that operates to allow the DA 200 to communicate data or other information with other nodes using a variety of communication interfaces. For example, the transceiver 206 comprises Bluetooth 214, WiFi 216, and WWAN 218 interfaces that can be used to establish communication links with nodes on a connected universal overlay network or with nodes on disconnected overlay networks. Although three communication interfaces are shown, the transceiver 206 can comprises any number and/or types of communication interfaces.

The memory 204 comprises any suitable storage device operable to store an overlay database 210, universal discovery module 212, advertisements (ADs) 220, and overlay (OL) routing module 222. The overlay database 210 comprises information (i.e., meta-data) associated with one or more overlay networks. For example, the overlay database 210 identifies connected universal overlay networks and/or disconnected overlay networks that the DA 200 should attempt to join based on the accessible communication links.

The universal discovery module 212 comprises one or more modules comprising instructions or codes executable by the processor 202 to provide the functions of the universal discovery system described herein.

The ADs 220 comprises information to be published on an overlay network identifying peers that provide access to one or more overlay networks. The ADs 220 comprise UNLs that identify nodes relative to universal overlay networks that can be used to reach the advertised networks.

The overlay routing module 224 comprises one or more modules comprising instructions or codes executable by the processor 202 to control how to route packets, maintain state, make repairs, and/or other functions associated with a particular overlay network.

The processor 202 comprises at least one of a CPU, processor, gate array, hardware logic, memory elements, and/or hardware executing software. In an aspect, the processor 202 operates to execute instructions of the universal discovery module 212 to control the DA 200 to perform the functions of the universal discovery system described herein. In another implementation, all of the functions of the DA 200 are implemented by one or more integrated circuits.

Overlay Network Database

During operation, the processor 202 operates to obtain the overlay database 210 that comprises information about overlay networks. For example, during node configuration, the overlay database 210 is downloaded to the DA 200 using an available interface of the transceiver 206 and stored in the memory 204 by the processor 202. During operation, the overlay database 210 is updated as the processor 202 becomes aware of information and/or meta-data associated with one or more overlay networks. In one implementation, the processor 202 receives user input that indicates the overlay networks to be associated with each interface. The processor 202 operates to store this information and/or meta-data in the overlay database 210. For example, the information in the overlay database 210 comprises, but is not limited to the following information.

1. Overlay network names
2. Node addresses
3. Introducer node addresses
4. Content types
5. Specific content
6. Quality of service (QoS) parameters
7. Overlay network operating region
8. Overlay network type Joining Overlay Networks The processor 202 operates to control the transceiver logic 206 to detect available communication links. For example, the transceiver logic 206 operates to determine available communication links using its communication interfaces (214, 216, 218). Based on the available communication links, the processor 202 operates to select overlay networks from the database 210 in which to participate. For example, if a WWAN communication link is detected, the processor 202 selects an overlay network from the overlay database 210 that is associated with WWAN communication link. Such a selection may be a connected universal overlay network, or a disconnected overlay network. The processor 202 then controls the transceiver 206 to join the selected overlay network.

Advertising Overlay Networks

Once a node joins a universal overlay network, the DA 200 generates and advertises other overlay networks to which the node can provide access. The advertisements include a UNL that identifies the node relative to the universal overlay network. For example, the processor 202 operates to generate advertisements associated with disconnected overlay networks and store these advertisements in the memory 204 as ADs 220. When the connected universal overlay network is joined, the processor 202 determines which disconnected overlay networks are accessible by the communication links of the transceiver 206. The processor 202 then selects the appropriate advertisement and controls the transceiver 206 to publish these advertisements on the connected universal overlay network. Therefore, any node on the connected universal overlay network may search for and discover the advertisements and obtain access to the disconnected overlay networks through the identified node by using the UNL included in the advertisement.

In an aspect, the universal discovery system comprises a computer program product having one or more program instructions ("instructions") or sets of codes ("codes") stored or embodied on a machine-readable medium. When the codes are executed by at least one processor, for instance, the processor 202, their execution causes the DA 200 to provide the functions of the universal discovery system described herein. For example, the machine-readable medium comprises a floppy disk, CDROM, memory card, FLASH memory device, RAM, ROM, or any other type of memory device or machine-readable medium that interfaces to the DA 200. In another aspect, the sets of codes may be downloaded into the DA 200 from an external device or communication network resource. The sets of codes, when executed, operate to provide the functions of a universal discovery system as described herein.

Figure 3:
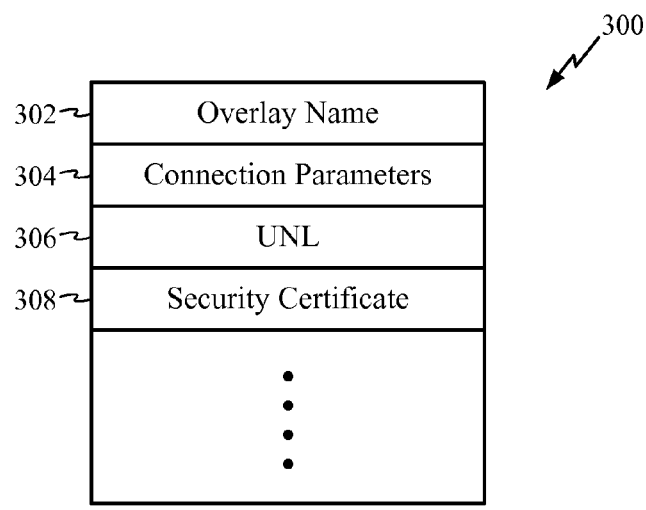
FIG. 3 shows an exemplary advertisement for use in accordance with the universal discovery system.

FIG. 3 shows an exemplary advertisement 300 for use in accordance with the universal discovery system. For example, the advertisement 300 may be the Ad at node 95 shown in FIG. 1. The advertisement 300 comprises an overlay name 302, connection parameters 304, UNL 306, and security certificate 308. The UNL 306 identifies a node on a universal overlay network that provides access to the advertised overlay network. It should be noted that the advertisement 300 may comprise more parameters if needed to identify the advertised network or control access to it.

Figure 4:
FIG. 4 shows an exemplary overlay database for use in accordance with the universal discovery system.

FIG. 4 shows an exemplary overlay database 400 for use in accordance with the universal discovery system. For example, the overlay database 400 may be the overlay database 210 shown in FIG. 2.

The overlay database 400 comprises interface types 402, network identifiers 404 and status 406. The interface types 402 identify the types of interfaces that may become available to a node during operation. For example, the interface types include WWAN, WiFi, and Bluetooth.

The network identifiers 404 identify networks to be joined for each interface type. For example, the network identifiers comprise universal connected and disconnected overlay networks, and a variety of other networks such as sports clips, photo share and music share networks. In one implementation the network identifiers are listed in priority so that if the corresponding interface type is available, the system operates to join the network identifier having the highest priority first. In some cases, it is possible to join multiple networks using the same interface type. For example, the WWAN interface type may be used to join the connected universal overlay network and a sports clip overlay network.

The status 406 identifies the current status of each identified network 404. For example, the universal connected overlay network on the WWAN interface is shown at joined.

Figure 5:
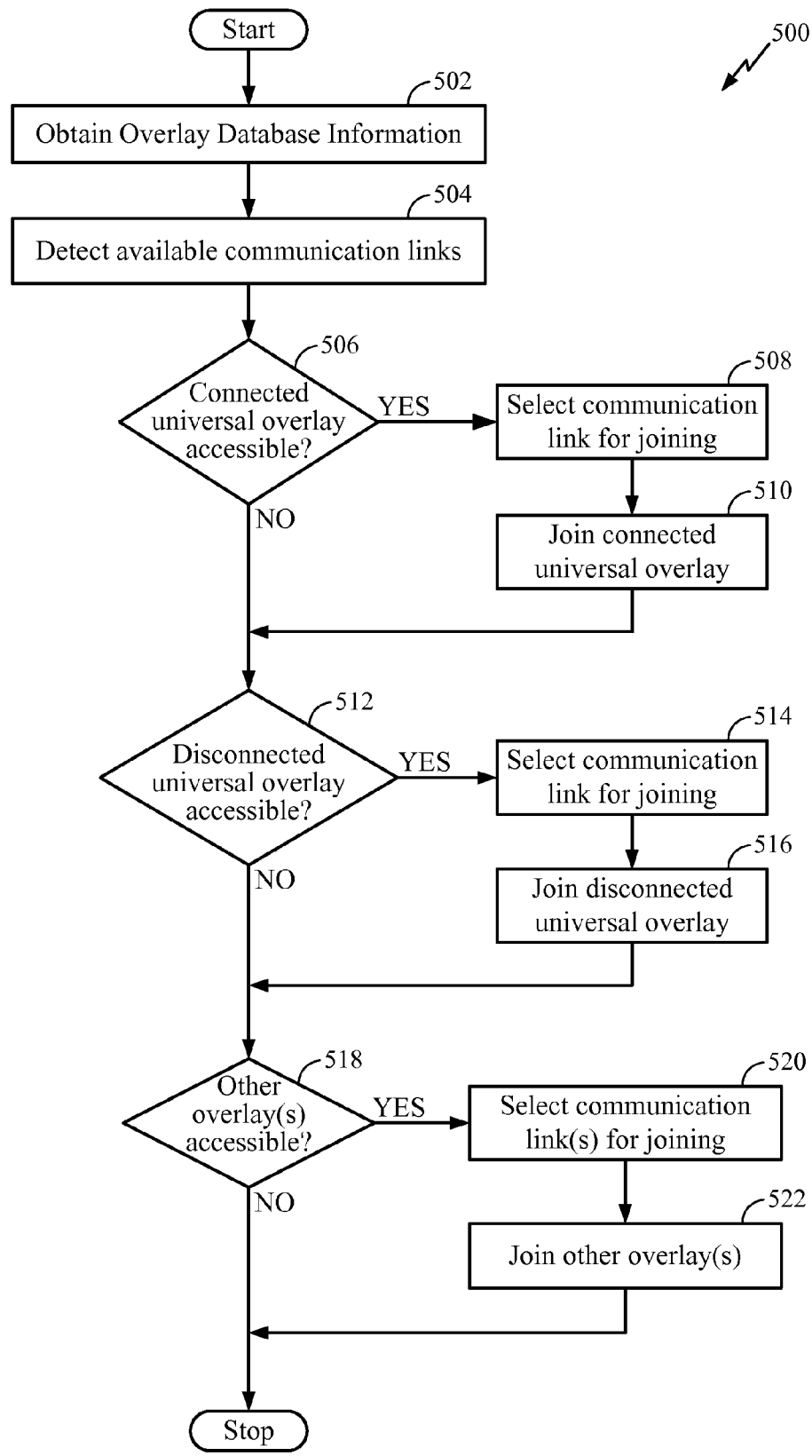
FIG. 5 shows an exemplary method for operating a discovery apparatus at a node in accordance with the universal discovery system.

FIG. 5 shows an exemplary method 500 for operating a discovery apparatus at a node in accordance with the universal discovery system. For clarity, the method 500 is described below with reference to the DA 200 shown in FIG. 2. In one implementation, the processor 202 executes one or more sets of codes provided by the discovery module 212 to control the DA 200 to perform the functions described below.

At block 502, information from an overlay database is obtained. The overlay database comprises information identifying overlay networks and associated communication interfaces that are to be used to participate on those networks. For example, the overlay database is formatted as the overlay database 400 shown in FIG. 4 and stored in the memory 204 as overlay database 210. In an aspect, information for the overlay database 210 is provided to the DA 200 during node configuration, downloaded to the DA 200 during operation, and/or updated with user input. The processor 202 operates to update, modify, and/or otherwise maintain the overlay database 210 as more overlay networks are detected or become available. In one implementation, information from the overlay database 210 is retrieve from the memory 204 by the processor 202.

At block 504, available communication links are detected. For example, the processor 202 controls the transceiver logic 206 to detect available communication links associated with one or more communication interfaces. The communication interfaces comprises WWAN, WiFi, Bluetooth, or any other suitable communication interface.

At block 506, a determination is made as to whether a connected universal overlay network is accessible given the detected communication links. In one implementation, the processor 202 makes this determination by controlling the transceiver 206 to determine if a connected universal overlay network is accessible on any of available interfaces. If the connected universal overlay is accessible on one or more interfaces, the method proceeds to block 508. If the connected universal overlay in not accessible, the method proceeds to block 512.

At block 508, an interface is selected that is to be used to join the connected universal overlay network. In one implementation, the processor 202 accesses the overlay database 210 to cross-reference the detected interfaces to determine which interface to use to connect to the connected universal overlay network. If the connected universal overlay is available on multiple interfaces, the processor 202 selects the interface to use based on signal strength, frequency, data rate, throughput, or any other parameter or criteria. Therefore, a low data rate connection to the connected universal overlay network may be replaced with a high data rate connection, if such a connection is available.

At block 510, the connected universal overlay network is joined. For example, the processor 202 controls the transceiver 206 to join the connected universal overlay network using the interface and communication link selected at block 508. After joining the processor 202 updates the status 406 in the database 210.

At block 512, a determination is made as to whether a disconnected overlay network is accessible given the detected communication links. In one implementation, the processor 202 makes this determination by controlling the transceiver 206 to determine if a disconnected universal overlay network is accessible on any of available interfaces. If the disconnected universal overlay is accessible on one or more interfaces, the method proceeds to block 514. If the disconnected universal overlay in not accessible, the method proceeds to block 518.

At block 514, an interface is selected that is to be used to join the disconnected universal overlay network. In one implementation, the processor 202 accesses the overlay database 210 to cross-reference the detected interfaces to determine which interface to use to connect to the disconnected universal overlay network. If the disconnected universal overlay is available on multiple interfaces, the processor 202 selects the interface to use based on signal strength, frequency, data rate, throughput, or any other parameter or criteria. Therefore, a low data rate connection to the disconnected universal overlay network may be replaced with a high data rate connection, if such a connection is available.

At block 516, the disconnected universal overlay network is joined. For example, the processor 202 controls the transceiver 206 to join the disconnected universal overlay network using the appropriate interface and communication link determined at block 514. After joining the disconnected overlay network, the processor 202 updates the status 406 in the database 210.

At block 518, a determination is made as to whether any other overlay networks are accessible given the detected communication links. In one implementation, the processor 202 makes this determination by controlling the transceiver 206 to determine if any other overlay network is accessible on any of available interfaces. If any other overlay network is accessible on one or more interfaces, the method proceeds to block 520. If no other overlay network is accessible, the method ends.

At block 520, interfaces are selected that is to be used to join one or more other overlay networks. In one implementation, the processor 202 accesses the overlay database 210 to cross-reference the detected interfaces to determine which interface to use to connect to the other overlay networks. If the other overlays are available on multiple interfaces, the processor 202 selects the interfaces to use based on signal strength, frequency, data rate, throughput, or any other parameter or criteria. Therefore, a low data rate connection to a particular overlay network may be replaced with a high data rate connection, if such a connection is available.

At block 522, the other overlay networks are joined. For example, the processor 202 controls the transceiver 206 to join the other overlay networks using the appropriate interfaces and communication links determined at block 520. After joining the other overlay networks, processor 202 updates the status 406 in the database 210.

Therefore, the method 500 operates to provide a fast and efficient system for the discovery and joining of overlay networks. The method 500 is performed by a discovery apparatus at a node in accordance with the universal discovery system. It should be noted that the method 500 is just one implementation and that the operations of the method 500 may be rearranged or otherwise modified within the scope of the various aspects. Thus, other implementations are possible.

Figure 6:
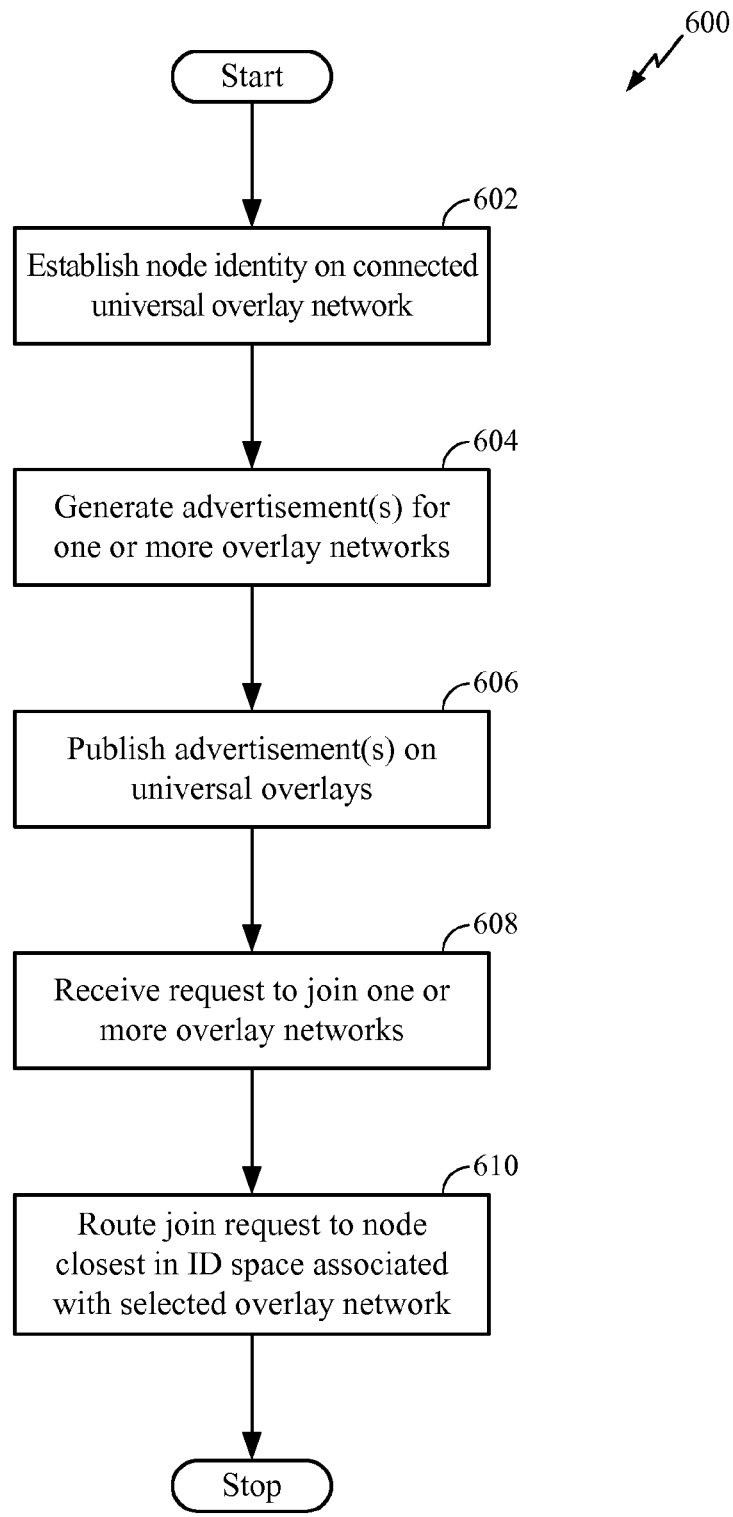
FIG. 6 shows an exemplary method for operating a discovery apparatus at a node in accordance with the universal discovery system.

FIG. 6 shows an exemplary method 600 for operating a discovery apparatus at a node in accordance with the universal discovery system. For clarity, the method 600 is described below with reference to the DA 200 shown in FIG. 2. In one implementation, the processor 202 executes one or more sets of codes provided by the discovery module 212 to control the DA 200 to perform the functions described below.

At block 602, a node identity is established on a connected universal network. For example, the processor 202 determines that a connected universal overlay network is accessible through an existing communication interface. The processor 202 then operates to control the transceiver 206 to join the connected universal overlay network using the appropriate communication interface and obtain a node identifier on the connected universal overlay network.

At block 604, advertisements for one or more overlay networks are generated. In an aspect, the processor 202 generates one or more advertisements that advertise one or more overlay networks to which the node currently has access. The advertisements are stored in the memory as part of the ADs 220. In an aspect, the advertisements are formatted as shown in FIG. 3. The advertisements comprise UNLs to identify nodes on a connected or disconnected universal overlay network that provide access to the advertised overlays.

At block 606, the generated advertisement(s) is published on a universal overlay network. In an aspect, the processor logic 202 controls the transceiver 206 to publish the advertisement on either a connected or disconnected universal overlay network.

At block 608, a request is received to access an advertised overlay network. For example, a second node having access to the universal overlay network discovers the advertisement and determines that a selected overlay network can be reached through the current node identified by the UNL in the advertisement. The second node sends a request to join the selected overlay network to the current node using the connected universal overlay network.

At block 610, the received join request is routed to the closest node in the identification space associated with the overlay network. The processor 202 receives the request and routes the request to the appropriate node on the advertised overlay network using the transceiver 206.

Therefore, the method 600 operates to provide a fast and efficient mechanism for advertising access to one or more overlay networks. The method 600 is performed by discovery apparatus 200 operating at a node in accordance with the universal discovery system. It should be noted that the method 600 is just one implementation and that the operations of the method 600 may be rearranged or otherwise modified within the scope of the various aspects. Thus, other implementations of the method 600 are possible.

Figure 7:
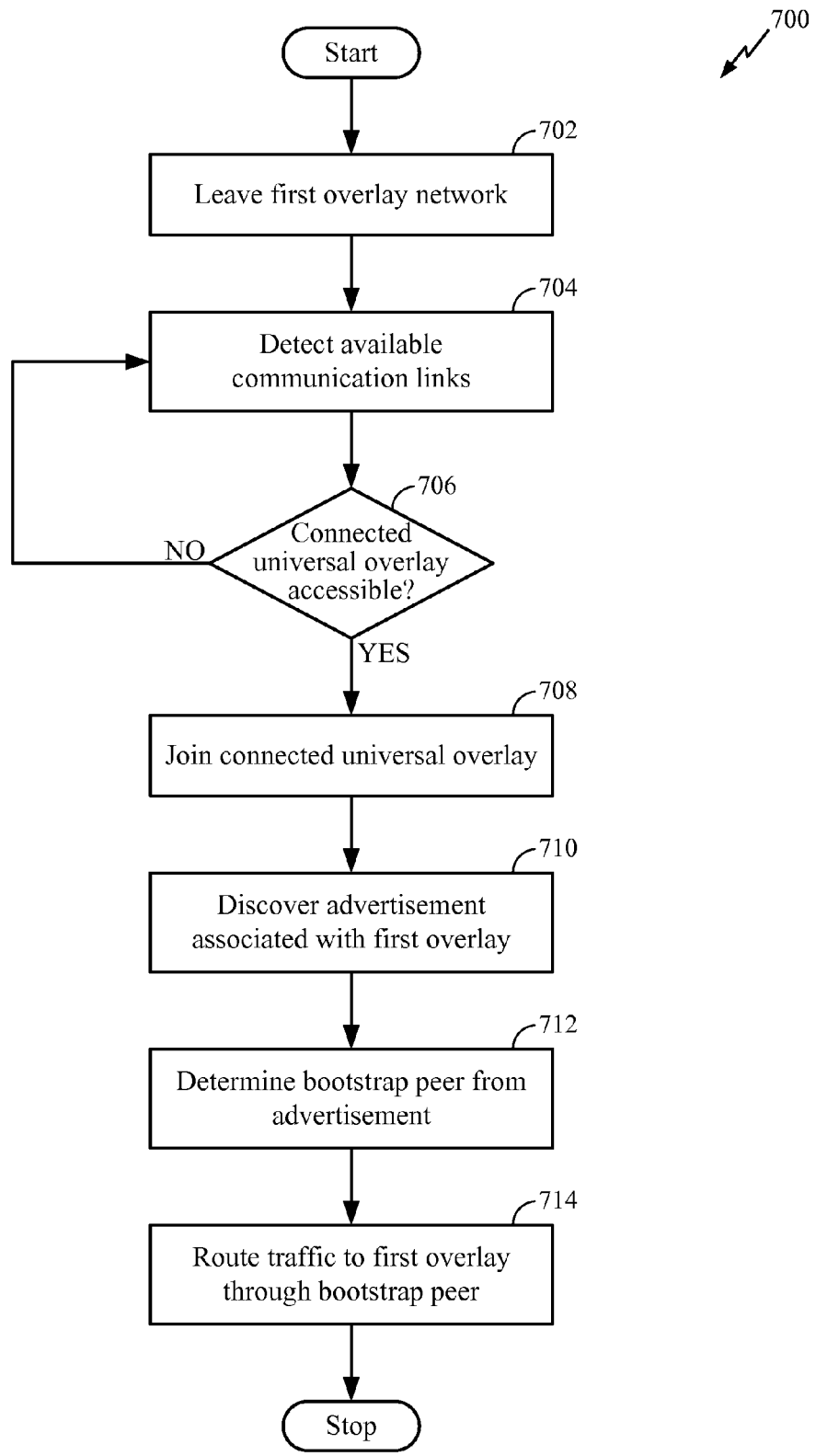
FIG. 7 shows an exemplary method for operating a discovery apparatus at a node in accordance with the universal discovery system.

FIG. 7 shows an exemplary method 700 for operating a discovery apparatus at a node in accordance with the universal discovery system. For clarity, the method 700 is described below with reference to the discovery apparatus 200 shown in FIG. 2. In one implementation, the processor 202 executes one or more sets of codes provided by the discovery module 212 to control the discovery apparatus 200 to perform the functions described below.

At block 702, communication with a first overlay network is terminated. For example, the node may be a mobile phone that is leaving its current geographic area and as a result, terminates a connection to a first overlay network. In an aspect, the processor 202 controls the transceiver 206 to terminate the network connection. The first overlay network may be a disconnected overlay network. The processor 202 also updates the status 406 in the database 210.

At block 704, available communication links are detected. In an aspect, the processor 202 controls the transceiver 206 to detect available communication links associates with one or more communication interfaces.

At block 706, a determination is made as to whether a connected universal overlay network is accessible. For example, the processor 202 determines if access to a connected universal overlay network is available based on the detected communication links. If the connected universal overlay network is accessible, the method proceeds to block 708. If the connected universal overlay network is not accessible, the method returns to block 704.

At block 708, a connected universal overlay network is joined. In an aspect, the processor 202 controls the transceiver 206 to join the connected universal overlay network using the appropriate communication interface and corresponding communication link. The processor 202 also updates the status 406 in the database 210.

At block 710, an advertisement for the first overlay network is discovered on the connected universal overlay network. In an aspect, the processor 202 controls the transceiver 206 to search the connected universal overlay network to discover the advertisement. For example, the advertisement is formatted as the advertisement 300 shown in FIG. 3.

At block 712, a bootstrap peer on the connected overlay network is determined that can provide access to the first overlay network. In an aspect, the processor 202 processes the advertisement to determine a bootstrap peer that can be used to reach the first overlay network. For example, the peer is identified on the universal overlay network by a UNL included in the advertisement.

At block 714, traffic is routed to the first overlay network using the bootstrap peer on the connected universal overlay network. In an aspect, the processor 202 controls the transceiver 206 to route traffic for the first overlay network using the peer.

Therefore, the method 700 allows a device to maintain communication with an overlay network during device mobility. The method 700 is performed by discovery apparatus 200 operating at a node in accordance with the universal discovery system. It should be noted that the method 700 is just one implementation and that the operations of the method 700 may be rearranged or otherwise modified within the scope of the various aspects. Thus, other implementations of the method 700 are possible.

Figure 8:
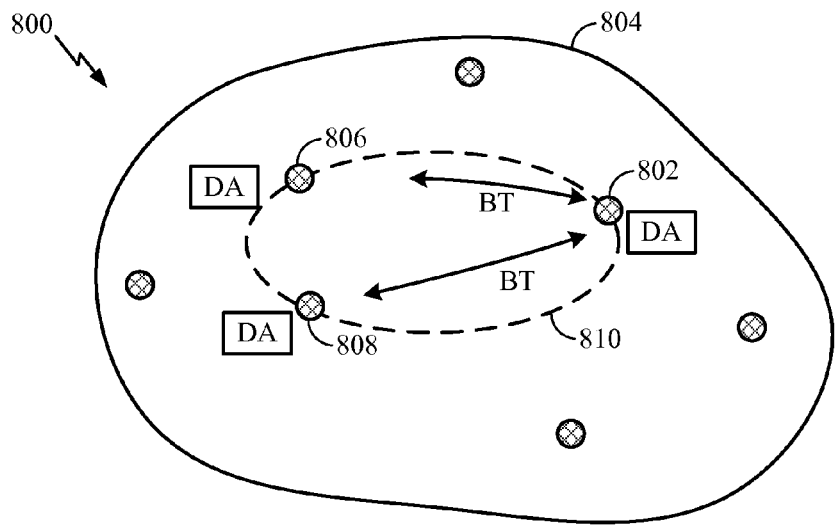
FIG. 8 shows a diagram illustrating exemplary operation of the universal discovery system.

FIG. 8 shows a diagram 800 illustrating exemplary operation of the universal discovery system. For example, the diagram 800 illustrates how a DA located at a node operates to advertise and form a disconnected universal overlay network.

The node 802 comprises a discovery apparatus that operates in accordance with the discovery system. The DA detects the available communication interfaces and selects a Bluetooth (BT) interface to advertise a disconnected universal overlay network to other nodes in the region 804. The nodes 806 and 808 communicate with the node 802 in response to the advertisement to form the disconnected overlay network 810. The nodes 802, 806, and 808 join the disconnected universal overlay network 810 based on information in their respective overlay databases.

Figure 9:
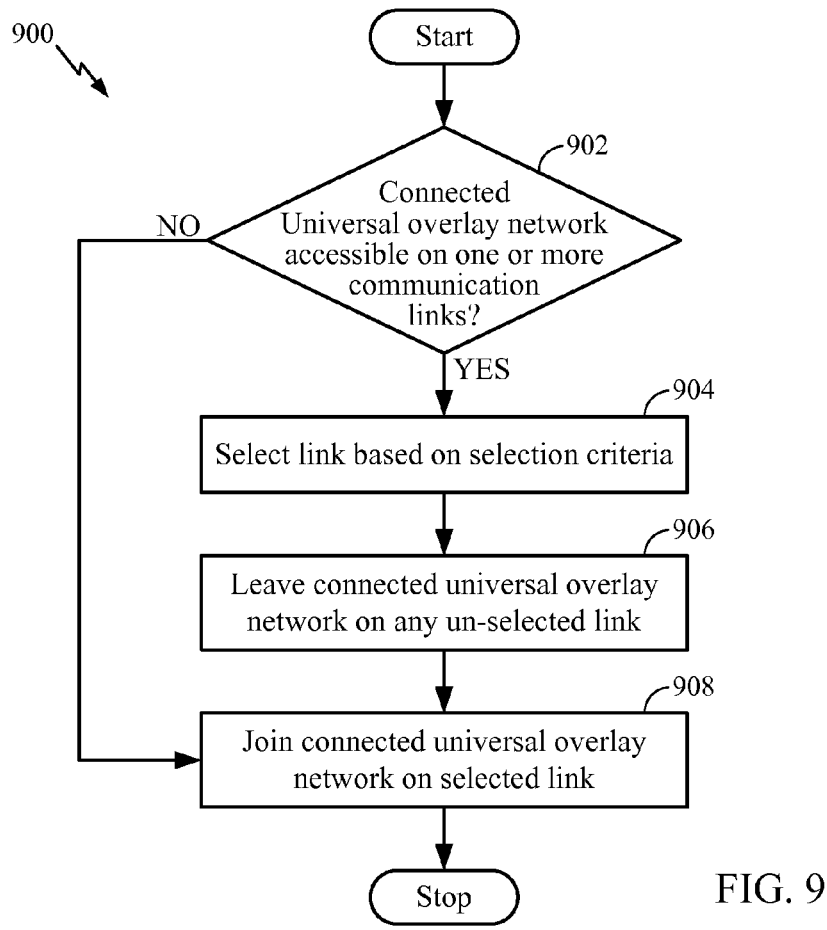
FIG. 9 shows an exemplary method for operating a discovery apparatus at a node in accordance with the universal discovery system.

FIG. 9 shows an exemplary method 900 for operating a discovery apparatus at a node in accordance with the universal discovery system. The method 900 is suitable for use at blocks 706 and 708 of the method 700. For clarity, the method 900 is described below with reference to the discovery apparatus 200 shown in FIG. 2. In one implementation, the processor 202 executes one or more sets of codes provided by the discovery module 212 to control the discovery apparatus 200 to perform the functions described below.

At block 902, a determination is made as to whether a connected universal overlay network is accessible on multiple communication links. For example, the processor 202 determines if access to a connected universal overlay network is available based on the detected communication links. If the connected universal overlay network is accessible on multiple communication links, the method proceeds to block 904. If the connected universal overlay network is accessible on a single communication link, the method proceeds to block 908.

At block 904, a link with which to join the connected universal overlay network is selected based on selection criteria. The processor 202 makes this selection. The selection criteria include but are not limited to frequency, bandwidth, data rate, throughput, and/or any other type of selection criteria. Thus, a high data rate link may be chosen over a low data rate link.

At block 906, any connection to the connected universal overlay network based on any unselected link is terminated. The processor 202 controls the transceiver 206 to perform this function.

At block 912, the selected link is used to join the connection universal overlay network. The processor 202 controls the transceiver 206 to join the connected universal overlay network using the selected link.

Therefore, the method 900 operates to select the best link available for connecting to the connected universal overlay. The method 900 is performed by discovery apparatus operating at a node in accordance with the universal discovery system. It should be noted that the method 900 is just one implementation and that the operations of the method 900 may be rearranged or otherwise modified within the scope of the various aspects. Thus, other implementations of the method 900 are possible.

Figure 10:
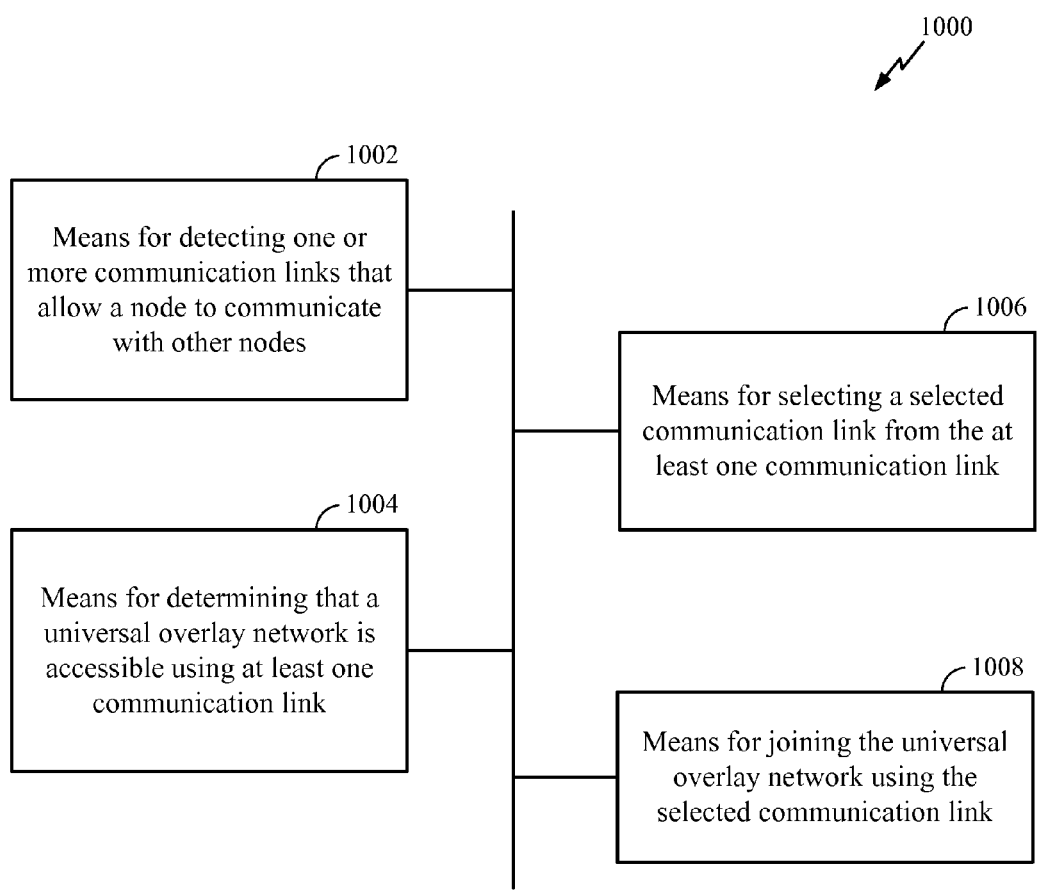
FIG. 10 shows exemplary discovery apparatus for use at a node in accordance with the universal discovery system.

FIG. 10 shows exemplary discovery apparatus 1000 for use at a node in accordance with the universal discovery system. For example, the DA 1000 is suitable for use as the DA shown in FIG. 1. In an aspect, the DA 1000 is implemented by at least one integrated circuit comprising one or more modules configured to provide aspects of the universal discovery system as described herein. For example, each module comprises hardware and/or hardware executing software.

The DA 1000 comprises a first module comprising means (1002) for detecting one or more communication links that allow a node to communicate with other nodes, which in an aspect comprises the transceiver 206. The DA 1000 also comprises a second module comprising means (1004) for determining that a universal overlay network is accessible using at least one communication link, which in an aspect comprises the processor 202. The DA 1000 also comprises a third module comprising means (1006) for selecting a selected communication link from the at least one communication link, which in an aspect comprises the processor 202. The DA 1000 also comprises a fourth module comprising means (1008) for joining the universal overlay network using the selected communication link, which in an aspect comprises the processor 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a universal discovery system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for operating a node to discover a peer-to-peer overlay network, the method comprising:
  detecting, via a transceiver controlled by a processor of the node, one or more communication links that allow the node to communicate with other nodes;
  determining that a universal overlay network is accessible using at least one communication link;
  selecting the at least one communication link;

joining the universal overlay network using the selected communication link; and generating, by the processor, a first advertisement that provides a first identifier that identifies the node on the universal overlay network as a bootstrap node for reaching a selected overlay network, wherein the first identifier is a universal node locator (UNL) relative to the universal overlay network.

2. The method of claim 1, wherein said determining comprises determining whether the universal overlay network is accessible based on information identifying overlay networks associated with each link.

3. The method of claim 2, wherein said determining whether the universal overlay network is accessible comprises retrieving the information from an overlay database.

4. The method of claim 3, wherein the overlay database comprises information for identifying a plurality of prioritized networks to be joined for each communication link type.

5. The method of claim 1, further comprising publishing the first advertisement on the universal overlay network.

6. The method of claim 1, further comprising obtaining a second advertisement from the universal overlay network that provides a second identifier that identifies a second node on the universal overlay that is used as a second bootstrap node for reaching a second selected overlay network.

7. The method of claim 6, wherein the second identifier is a second universal node locator (UNL).

8. The method of claim 7, further comprising communicating with the second selected overlay network utilizing the second UNL.

9. The method of claim 1, wherein the universal overlay network is one of a connected or disconnected universal overlay network.

10. The method of claim 1, wherein the selected overlay network is different from the universal overlay network, and wherein the UNL is different from an Internet Protocol (IP) address and a port number and allows an overlay to be discovered and reformed across disjoint subnets.

11. An apparatus of a network node for discovering peer-to-peer overlay networks, the apparatus comprising:
a transceiver configured to detect one or more communication links that allow the network node to communicate with other network nodes; and
a processor configured to:
determine that a universal overlay network is accessible using at least one communication link;
select the at least one communication link;
join the universal overlay network using the selected communication link; and
generate a first advertisement that provides a first identifier that identifies the network node on the universal overlay network as a bootstrap node for reaching a selected overlay network, wherein the first identifier is a universal node locator (UNL) relative to the universal overlay network.

12. The apparatus of claim 11, wherein said processor is configured to determine whether the universal overlay network is accessible based on information identifying overlay networks associated with each link.

13. The apparatus of claim 12, wherein said processor is configured to retrieve the information from an overlay database.

14. The apparatus of claim 13, wherein the overlay database comprises information for identifying a plurality of prioritized networks to be joined for each communication link type.

15. The apparatus of claim 11, wherein said processor is configured to publish the first advertisement on the universal overlay network.

16. The apparatus of claim 11, wherein said processor is configured to obtain a second advertisement from the universal overlay network that provides a second identifier that identifies a second node on the universal overlay that is used as a second bootstrap node for reaching a second selected overlay network.

17. The apparatus of claim 16, wherein the second identifier is a second universal node locator (UNL).

18. The apparatus of claim 17, wherein said processor is configured to communicate with the second selected overlay network utilizing the second UNL.

19. The apparatus of claim 11, wherein the universal overlay network is one of a connected or disconnected universal overlay network.

20. The apparatus of claim 11, wherein the selected overlay network is different from the universal overlay network, and wherein the UNL is different from an Internet Protocol (IP) address and a port number and allows an overlay to be discovered and reformed across disjoint subnets.

21. An apparatus of a network node for discovering peer-to-peer overlay networks, the apparatus comprising:
means for detecting one or more communication links that allow the network node to communicate with other network nodes;
means for determining that a universal overlay network is accessible using at least one communication link;
means for selecting the at least one communication link;
means for joining the universal overlay network using the selected communication link; and
means for generating a first advertisement that provides a first identifier that identifies the network node on the universal overlay network as a bootstrap node for reaching a selected overlay network, wherein the first identifier is a universal node locator (UNL) relative to the universal overlay network.

22. The apparatus of claim 21, wherein said means for determining comprises means for determining whether the universal overlay network is accessible based on information identifying overlay networks associated with each link.

23. The apparatus of claim 22, wherein said means for determining whether the universal overlay network is accessible comprises means for retrieving the information from an overlay database.

24. The apparatus of claim 21, further comprising means for publishing the first advertisement on the universal overlay network.

25. The apparatus of claim 21, further comprising means for obtaining a second advertisement from the universal overlay network that provides a second identifier that identifies a second node on the universal overlay that is used as a second bootstrap node for reaching a second selected overlay network.

26. The apparatus of claim 25, wherein the second identifier is a second universal node locator (UNL).

27. The apparatus of claim 26, further comprising means for communicating with the second selected overlay network utilizing the second UNL.

28. The apparatus of claim 21, wherein the universal overlay network is one of a connected or disconnected universal overlay network.

29. A non-transitory computer-readable medium for discovering peer-to-peer overlay networks, the computer-readable medium embodying codes executable by a processor of a network node to:

detect one or more communication links that allow the network node to communicate with other network nodes;

determine that a universal overlay network is accessible using at least one communication link;

select the at least one communication link;

join the universal overlay network using the selected communication link; and generate a first advertisement that provides a first identifier that identifies the network node on the universal overlay network as a bootstrap node for reaching a selected overlay network, wherein the first identifier is a universal node locator (UNL) relative to the universal overlay network.

30. The computer-readable medium of claim 29, wherein said codes are configured to cause the processor to determine whether the universal overlay network is accessible based on information identifying overlay networks associated with each link.

31. The computer-readable medium of claim 30, wherein said codes are configured to cause the processor to retrieve the information from an overlay database.

32. The computer-readable medium of claim 29, wherein said codes are configured to cause the processor to publish the first advertisement on the universal overlay network.

33. The computer-readable medium of claim 29, wherein said codes are configured to cause the processor to obtain a second advertisement from the universal overlay network that provides a second identifier that identifies a second node on the universal overlay that is used as a second bootstrap node for reaching a second selected overlay network.

34. The computer-readable medium of claim 33, wherein the second identifier is a second universal node locator (UNL).

35. The computer-readable medium of claim 34, wherein said codes are configured to cause the processor to communicate with the second selected overlay network utilizing the second UNL.

36. The computer-readable medium of claim 29, wherein the universal overlay network is one of a connected or disconnected universal overlay network.

* * * * *